United States Patent [19]

Schliep

[11] 4,227,314
[45] Oct. 14, 1980

[54] CARPENTER SQUARE WITH TAPE HOLDER

[76] Inventor: Edward Schliep, 3218 Twin City Dr., Mandan, N. Dak. 58554

[21] Appl. No.: 14,181

[22] Filed: Feb. 22, 1979

[51] Int. Cl.³ .............................................. B43L 7/08
[52] U.S. Cl. ....................................... 33/480; 33/484
[58] Field of Search ............................ 33/484–487, 33/489, 490, 423, 425, 427, 429, 480, 27 C, 138, 173

[56] References Cited

U.S. PATENT DOCUMENTS

| 357,771 | 2/1887 | Janssen et al. | 33/173 |
| 2,571,569 | 10/1951 | Greenwood | 33/484 |
| 2,651,843 | 9/1953 | Goodford | 33/27 C |
| 3,357,106 | 12/1967 | Schneider | 33/138 |
| 3,390,461 | 7/1968 | Anderson | 33/464 |
| 3,823,481 | 7/1974 | Chapin | 33/429 |

Primary Examiner—Charles E. Phillips
Attorney, Agent, or Firm—Schwartz, Jeffery, Schwaab, Mack, Blumenthal & Koch

[57] ABSTRACT

A carpenter square having a tape holding section adapted to receive tape measure housings of varying width. The tape housing engages a curved section and one leg of the square, and can be clamped in position. A slot is provided through which the tape extends for measuring and marking. The square is also provided with a positioning bar slidably mounted on the other leg of the square for non-perpendicular cuts.

6 Claims, 4 Drawing Figures

CARPENTER SQUARE WITH TAPE HOLDER

BACKGROUND OF THE INVENTION

The present invention relates as indicated to a carpenter square provided with holding means for a tape measure.

It is frequently necessary when using a carpenter square to use along with such square a tape measure or other measuring device for accurately measuring the location of cuts to be made in the material, normally wood. Even when working at ground level, the simultaneous or sequential manipulation of the tape measure and square presents some difficulties, and these difficulties are greatly magnified when the user is positioned above the ground, for example, on a semi-completed building structure, for laying out rafters.

It is therefore highly desirable to combine the square and tape measure into a single working device so that the measured distances can be marked prior to cutting, without necessitating the separate use of the square and tape measure. An example in the prior art of a combined square and tape measure is disclosed in U.S. Pat. No. 2,571,569 to W. Greenwood, with the square comprising an opening on one side thereof which can frictionally receive the tape measure when lying flat. To use the tape, it is moved so as to be perpendicular to the plane of the square, in which position the end of the tape can be extended longitudinally relative to the side of the square on which it is mounted.

A similar combined square and tape measure was developed by applicant, with the square being provided with a separate compartment into which the tape measure could be placed on end for extending the tape relative to the square to obtain properly marked measurements.

In both applicant's prior device and that of Greenwood there were significant disadvantages. Perhaps the foremost was the inability to accommodate tape measures of various sizes and shapes. Tapes vary significantly in the width dimension, and the inability to satisfactorily accommodate tapes of varying width is a decided disadvantage. Moreover, in the Greenwood device, the opening provided in the leg of the square is particularly adapted to only a particular size tape, thereby rendering the square totally useless for tapes either larger or smaller than such opening.

SUMMARY OF THE INVENTION

With the above in mind, a principal object of the present invention is to provide a carpenter square particularly adapted for holding tape measures of various sizes and widths. In accordance with the invention, the holding compartment formed integrally with one leg of the square is provided with a side wall portion which extends parallel to the leg of the square, and a curved end portion which extends from such straight portion to the leg of the square. In this manner, the tape measure, regardless of width, can be moved forwardly within the tape holding section to contact the curved surface on the tape holder thereby to provide stability for the tape. Means are additionally provided to secure the tape measure in its mounted position within the tape holding section after the tape has been mounted as above described. In this manner, the tape measure can be positioned to achieve the greatest stability, and thereafter locked in place. The curved section of the holder above referred to is formed with a continuous slot which is aligned with the opening of the tape housing through which the tape extends so that the tape can be freely extended from the housing in the normal manner.

A further objective of the invention is to provide a square of the type described having the further feature of a positioning bar adapted for sliding movement along the edge of the other leg of the square. In this manner, the positioning bar can be adjusted for scribing along the edge of the leg of the square on which it is mounted, with this feature being particularly desirable for cutting rafters or the like where the cut is at an angle relative to the longitudinal side edges of the material.

A still further object of the invention is to provide a tape holder section formed with an opening by means of which an automatic return button forming part of the tape can be reached and depressed for tape return. The tape return button is a feature found frequently on more expensive tape measures, and the provision of an opening in the tape holder permits such return to be operated without removal of the tape from its mounted position within the tape holder.

These and other objects of the invention will be apparent as the following description proceeds in particular reference to the application drawing.

BRIEF DESCRIPTION OF THE APPLICATION DRAWING

DETAILED DESCRIPTION OF THE PREFERRED EMBODIMENT

Figure 1:
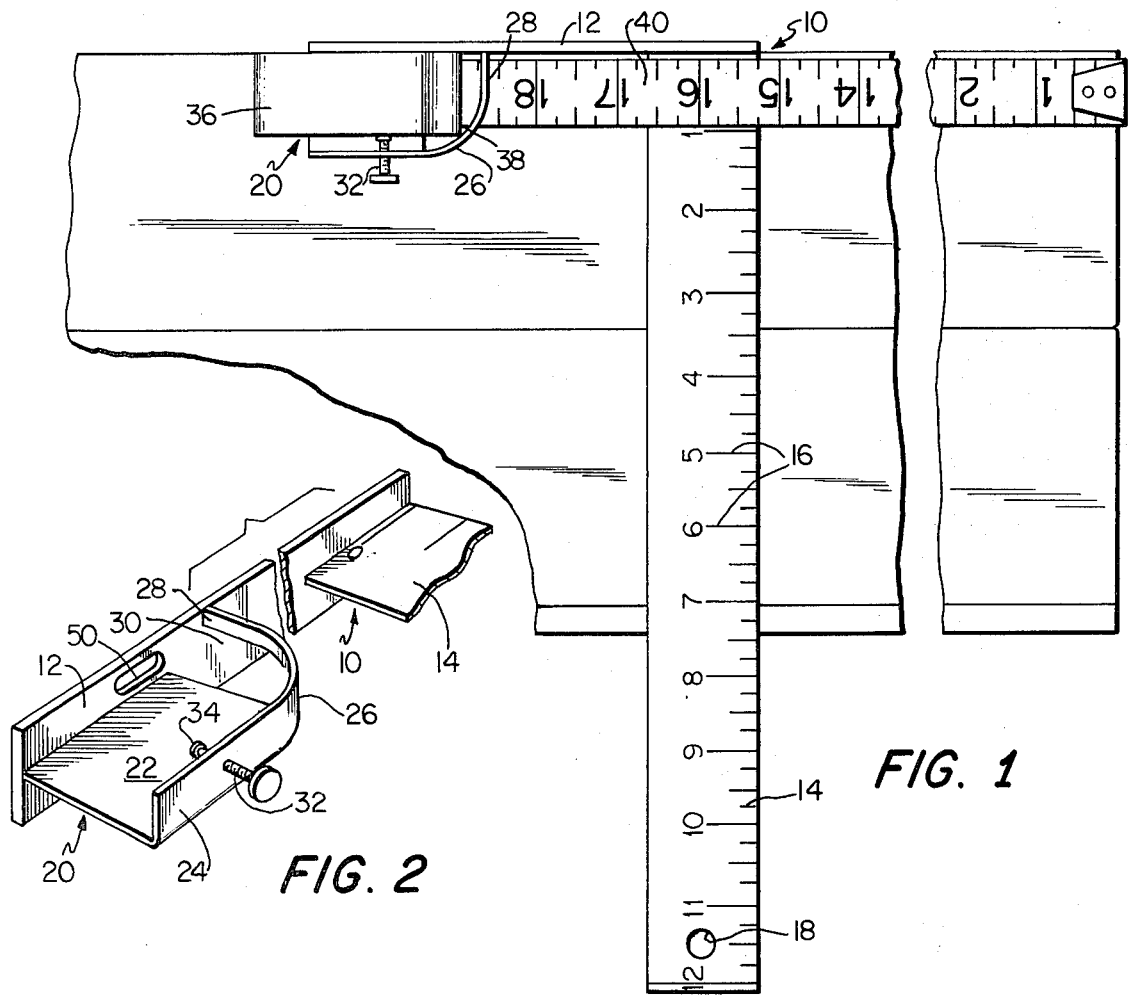
FIG. 1 is a top plan view, partially fragmented, showing the positioning of the carpenter square of the invention on the material to be marked or scribed.

Referring now in more detail to the application drawing, where like parts are indicated by like reference numerals in the several figures, the carpenter square is generally indicated at 10 and includes a first leg section 12 and a second leg section 14 securely mounted in any suitable manner to the first leg section. It will be noted that in reference to FIGS. 1 and 2, the leg section 12 is disposed on a vertical plane and the section 14 in a horizontal plane, with the latter being secured to the leg section 12 approximately intermediate the height thereof, for a purpose which will be more apparent as the following description proceeds.

The leg section 14 contains the normal indicia 16 for measuring along such leg section. An opening 18 is provided at the opposite end of the leg 14 to permit the square to be hung on a belt or the wall of a shop or similar environment.

A tape holder generally indicated at 20 is mounted on the leg section 12. Referring to FIG. 2, the holder comprises a flat base 22 integrally or otherwise secured to the leg section 12 and preferably being coplanar with the leg section 14. The tape holder further includes a straight side wall portion 24 which in the form shown constitutes a flange extending upwardly perpendicularly from the flat base in spaced predetermined distance from the leg 12. The flange merges into a curved wall section 26 which in turn merges into a straight wall portion 28 which extends generally perpendicularly to the flange 24 and secured in any suitable manner to the leg 12 at the juncture thereof. As noted, the wall portion 28 is abreviated in height so as to provide a relatively wide slot 30 through which the tape can extend during use of the device as shown in FIG. 1.

It is common knowledge to those in the art that tape measure housings come in a great variety of widths, and it is impractical from a commercial standpoint to provide an inventory of carpenter squares with tape holding attachments wherein the side wall portions 24 are spaced in varying amounts from the leg 12 to accommodate various sizes of tape housings. An important feature of the present invention therefore resides in the providing of a tape holder which is adaptable to receive tapes of varying width, and to securely maintain each tape housing, regardless of width, in the tape holder. To achieve this end, a set screw 32 is provided which extends through a threaded opening in the side wall 24, with the set screw preferably being formed with an enlarged pad 34 at the leading edge thereof to provide a larger contact surface area for retaining the tape housing in the tape holder.

Figures 2, 3:
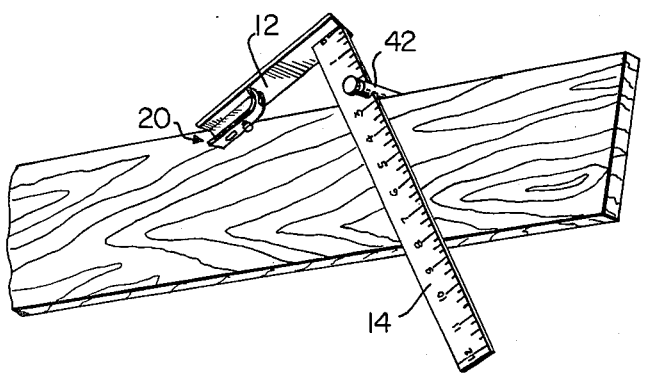
FIG. 2 is a fragmentary perspective view of the carpenter square, showing in more detail the tape holder section.
FIG. 3 is a perspective view of the carpenter square and the positioning bar, showing the manner in which the square is used for the marking or scribing of rafters.

FIG. 1 illustrates a tape housing 36 mounted in the tape holder 20, with the housing 36 being of typical width and supported on the flat base 22 of the tape holder. It will be understood that most tape housings are formed with a flat base. The leading edge 38 of the tape housing engages the curved wall section 26 of the tape holder, with the opposite side wall of the tape housing engaging the leg 12. Thus, the tape housing can be positioned on the flat base 22 and moved forwardly as far as possible until contact is made with the curved surface 26. The set screw 32 is then tightened to firmly engage the adjacent side wall of the tape housing 36 to firmly retain the tape housing in its mounted position in the tape holder. The tape 40 can be withdrawn from the tape housing 36 in the usual manner, with the slot 30 below the wall portion 28 of the holder accommodating the dimension of the tape. It should be noted in this regard that the width of the slot 30 is such as to accommodate virtually all widths of tape housings. It should further be noted that the spacing of the flanged side wall 24 from the leg 12 is such as to accommodate essentially all tape housings currently being used by carpenters in the field.

Figure 4:
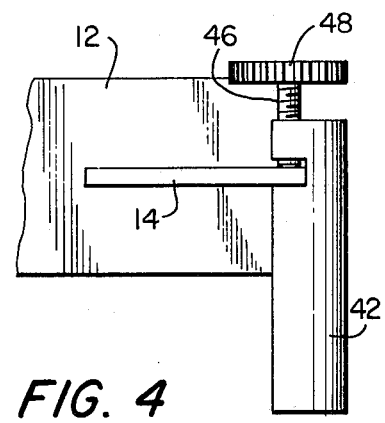
FIG. 4 is a top plan view showing the manner in which the positioning bar is slidably mounted along the edge of one leg of the square.

Referring to FIGS. 3 and 4, a positioning bar 42 is slidably movable along the leg 14 of the square. Referring to FIG. 4, the bar 42 is formed with a slot 44 which receives the edge of the leg 14, and a set screw 46 with an enlarged adjusting head 48 extends through a threaded opening provided therefor in the bar 42 into firm contact engagement with the leg thereby to retain the positioning bar in the desired position along said leg.

The positioning bar 42 is particularly adapted for use in cutting rafters wherein the angle of cut is not perpendicular to the longitudinal plane of the wood. FIG. 3 illustrates the manner in which the square is used for this purpose, and it will be noted that the leg 12 is supported at one area on the edge of the rafter, and the positioning bar at a second point. A line can then be scribed on the face of the rafter so that the proper angle of cut can be made. It will be apparent that the angle of cut can be easily established simply by moving the positioning bar 42 along the surface of the leg 14, and retaining the bar in such position. If square cuts are to be made, that is, cuts perpendicular to the longitudinal plane of the material, the positioning bar can be entirely removed from the leg 14 so that the flat leg 12 rests on the surface of the rafter. Where steeper angles are necessary, the bar 42 can be slid further down the leg 14 and positioned in place.

As previously noted, the plane of the flat base 22 of the tape holder 20 is the same as the plane of the leg 14, thereby facilitating the placement of the square for rafter cutting as shown in FIG. 3. A substantial area of the leg 12 is able to contact the top of the rafter, while the leg 14 can be pressed flat against the side of the rafter, thereby providing an accurate mark.

Occasionally, tape holders are provided with an automatic return button which, when depressed, automatically withdraws the tape into the holder. To accommodate operation of these return buttons without requiring removal of the tape housing from the tape holder, the leg 12 of the square is formed with an elongated slot 50 which is positioned to be in alignment with the location of most of the return buttons adjacent the base of the tape housing. When the return buttons are positioned above the leg section 12, operation thereof is obviously not a problem.

It will thus be seen that the invention is particularly designed to handle tapes of all sizes and shapes. The provision of the curved wall section 28 permits the tape holder, regardless of width, to engage a point along such curved surface, with the side of the tape holder positioned contiguous the leg 12. This contact, in conjunction with the tape housing resting on the flat base, provides a stable mounting, which can be maintained by tightening the set screw 32 into firm engagement with the adjacent side wall of the tape housing. The slot 30 below the wall portions 26 and 28 is of sufficient height and width to accommodate the tape from virtually all tape housings, regardless of width, whereby the tape can be easily paid out or returned to the tape housing in the normal use of the square. As above described, the mounting of the tape on the square greatly facilitates the measuring process and avoids the separate handling and manipulation of the square and tape measure. The square is further adapted for rafter cutting through the provision of a positioning bar slidably mounted on the ruler leg of the square. During the measuring and cutting of rafters, the tape housing can be removed from the tape holder since there is not need for measurement, and the positioning bar can be quickly and easily removed from the ruler leg of the square when the tape housing is reinstalled in the tape holder for normal right angle cuts.

I claim:

1. A carpenter square with tape holding means comprising:
   (a) a square having first and second legs arranged perpendicular to each other,
   (b) a tape holding section mounted on one of said legs, said tape holding section comprising a flat base on which the tape housing is supported, a straight side wall portion spaced from and parallel to said one leg, a curved portion which interconnects said side wall portion and said one leg, said curved portion having therebelow a slot the bottom of which is in the same plane as said base so that a tape can be directed through said slot for measuring purposes, whereby tapes having different size housings can be inserted between said one leg and said side wall portion, in contact with said one leg, and the leading edge of such a housing moved into contact with said curved portion to position such housing in contact both with said curved portion and said leg, and (c) means carried by said side wall portion for contacting the adjacent side of such tape housing positioned as aforesaid for holding such tape housing in such position.

2. The carpenter square of claim 1 wherein said means carried by said side wall portion for contacting the adjacent side of the tape housing comprises a set screw extending through a threaded opening in said side wall portion, the leading end of said set screw being adapted to contact the tape housing and firmly hold the same in place.

3. The carpenter square of claim 1 further including a slot formed in said one leg of said square to permit access to the adjacent side wall of the tape housing for manipulation of a tape return button.

4. The carpenter square of claim 1 wherein said first and second legs are arranged in planes perpendicular to each other, with said second leg being secured to said first leg approximately intermediate the height thereof, said second leg being generally coplanar with the flat base of said tape holding section, whereby the square can be placed on the material to be scribed with both the second leg and bottom of the base of the tape holder contacting the same.

5. The carpenter square of claim 1 further including a positioning bar slidably mounted along one edge of said second leg, said positioning bar including a recess adapted to receive the edge of said second leg, and a threaded opening for receiving a set screw by means of which the positioning bar can be clamped in the desired position on said second leg.

6. The carpenter square of claim 1 wherein said straight side wall portion of said tape holding section comprises a flange extending perpendicularly upwardly from the outer edge of said flat base, with said flanged side wall portion merging into a curved wall portion, which in turn merges into a further straight wall portion perpendicular to said flanged straight wall portion, with said slot being below said curved and further straight wall portions.

* * * * *